United States Patent [19]

Danzer

[11] 3,987,440
[45] Oct. 19, 1976

[54] TRACK WHILE SCAN OPERATION ON SCINTILLATING POINT TARGETS

[75] Inventor: Paul M. Danzer, Norwalk, Conn.

[73] Assignee: United Technologies Corporation, Hartford, Conn.

[22] Filed: July 16, 1975

[21] Appl. No.: 596,687

[52] U.S. Cl. .............................. 343/7 A; 343/5 VQ
[51] Int. Cl.² ........................ G01S 7/30; G01S 9/02
[58] Field of Search .......................... 343/5 VQ, 7 A

[56] References Cited
UNITED STATES PATENTS

| | | | |
|---|---|---|---|
| 3,487,405 | 12/1969 | Molho et al. | 343/5 VQ X |
| 3,646,588 | 2/1972 | Van Popta | 343/5 VQ X |
| 3,680,095 | 7/1972 | Evans | 343/7 A |
| 3,699,573 | 10/1972 | Andrews et al. | 343/7 A X |

Primary Examiner—Malcolm F. Hubler
Attorney, Agent, or Firm—Dominic J. Chiantera

[57] ABSTRACT

In a track while scan radar system having a tracking processor for providing range and azimuth tracking gates for automatic range and azimuth cursor tracking of a designated target in response to the magnitudes of target return signals received within the tracking gates, circuitry is provided for predicting the magnitudes of succeeding designated target return signals as a function of the actual magnitudes of preceding designated target return signals, and for providing through accumulator circuits to the tracking processor a signal manifestation of each succeeding target return signal occurring within the tracking gates, the magnitude of the signal manifestation being a function of the comparative magnitudes of the predicted and actual target return signal.

3 Claims, 6 Drawing Figures

TRACK WHILE SCAN OPERATION ON SCINTILLATING POINT TARGETS

BACKGROUND OF THE INVENTION

1. Field of Invention

This invention relates to track while scan radar systems, and more particularly to an improved track while scan operation on scintillating point targets.

2. Description of the Prior Art

The principles of operation of track while scan radar systems are well known in the art. These systems scan through a given sector and provide instantaneous information on the location of a designated target within the scanned sector by determining the range and relative azimuth angle of the target from the radar antenna. Through the use of "sliding window" computer processing, the system tracks the target while the scanning of the entire sector area continues. The system performs the target tracking operation through a comparison of the reflected target energy of the return pulses taken with respect to timing gates in an azimuth and range timing axis, and provides coordinate values for an azimuth cursor and a range cursor. The azimuth cursor coordinates nominally represent the azimuthal point which bisects the energy distribution of a target envelope generated by the locus of the magnitudes of all of the return pulses received along the azimuth axis during a single scan through the target, while the range cursor coordinates represents the range value coinciding with the midpoint of the energy distribution of each individual return pulse. Typically, the track while scan radar narrows down the location of the target to one or two pulses in azimuth and to one range gate resolution in range. All this is known in the art, and an illustration of the tracking function detail is shown in my U.S. Pat. No. 3,845,481. An early, analog track while scan radar of this type is disclosed, inter alia, in Frank, U.S. Pat. No. 3,182,320, assigned to the U.S. Air Force. More sophisticated, digital track while scan radar systems are exemplified by the systems employed by the FAA for aircraft traffic control.

In the prior art track while scan systems, the operation is ideally based upon an assumed smooth return from the target, where all of the generated main bang pulses are reflected and received by the radar receiver, and are distributed in a coherent manner. However, the effects of scintillation, caused partly by small pockets or strata of air whose temperatures and densities differ slightly from those of their surroundings, are not accounted for. These scintillation effects result in distorted beam transmission which produces rapid variations in return pulse amplitude, creating an apparent change in target position or shape. For a moving target the effects of scintillation create difficulties and inaccuracies in determining the midpoint of the azimuth energy distribution since the scintillation effects differ in subsequent scans through the target as a result of the change in relative antenna to target azimuth position. Therefore, in any single scan of a scintillating target return signal the comparison of the energies within the target envelope in the azimuth left and right gates may be quite misleading and result in large short term errors.

SUMMARY OF INVENTION

An object of the present invention is to provide improved azimuth tracking of scintillating target return signals in a track while scan radar system.

According to the present invention, in a track while scan radar system having a tracking processor for providing range and azimuth tracking gates for automatic range and azimuth cursor tracking of a designated target in response to the magnitudes of target return signals received within the tracking gates, a signal prediction of the magnitude of each succeeding designated target return signal is provided as a function of the preceding designated target return signals and a signal manifestation of each suceeding target return signal is provided at a magnitude which is a function of the comparative magnitudes of the predicted and actual target return signals, a summing means provides the sum of the magnitudes of all of the signal manifestations occurring within each of the azimuth tracking gates to the tracking processor. In further accord with the present invention, the signal manifestation magnitude is equal to the predicted magnitude whenever the magnitude of the actual target return signal is less than the magnitude of the predicted signal by a predetermined tolerance, the signal manifestation magnitude being equal to the magnitude of the actual target return signal in all other instances.

The improved track while scan operation on scintillating point targets of the present invention uses a fixed number of constants representative of the terms of a curve fitting equation describing a predetermined reference target return signal envelope (the envelope being defined as the locus of the magnitudes of the target return signals received from a single scan through the target). The number of equation constants used is variable to within the accuracy requirements of the system requirements, thereby permitting flexibility in the hardware implementation. The reference curve may be of any predetermined shape, such as that of the shape of the radar main beam pattern which is representative of the target return signal envelope of a "point target". The values of the constant terms are derived in any number of well known methods used in the curve fitting procedures known in the art. Through the use of the standard curve equation constants an the actual magnitudes of preceding target return signals to provide a signal prediction of a succeeding target return signal, an improved target return envelope derived from an actual scintillating target return envelope is provided without the use of a computer and complex procedures.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
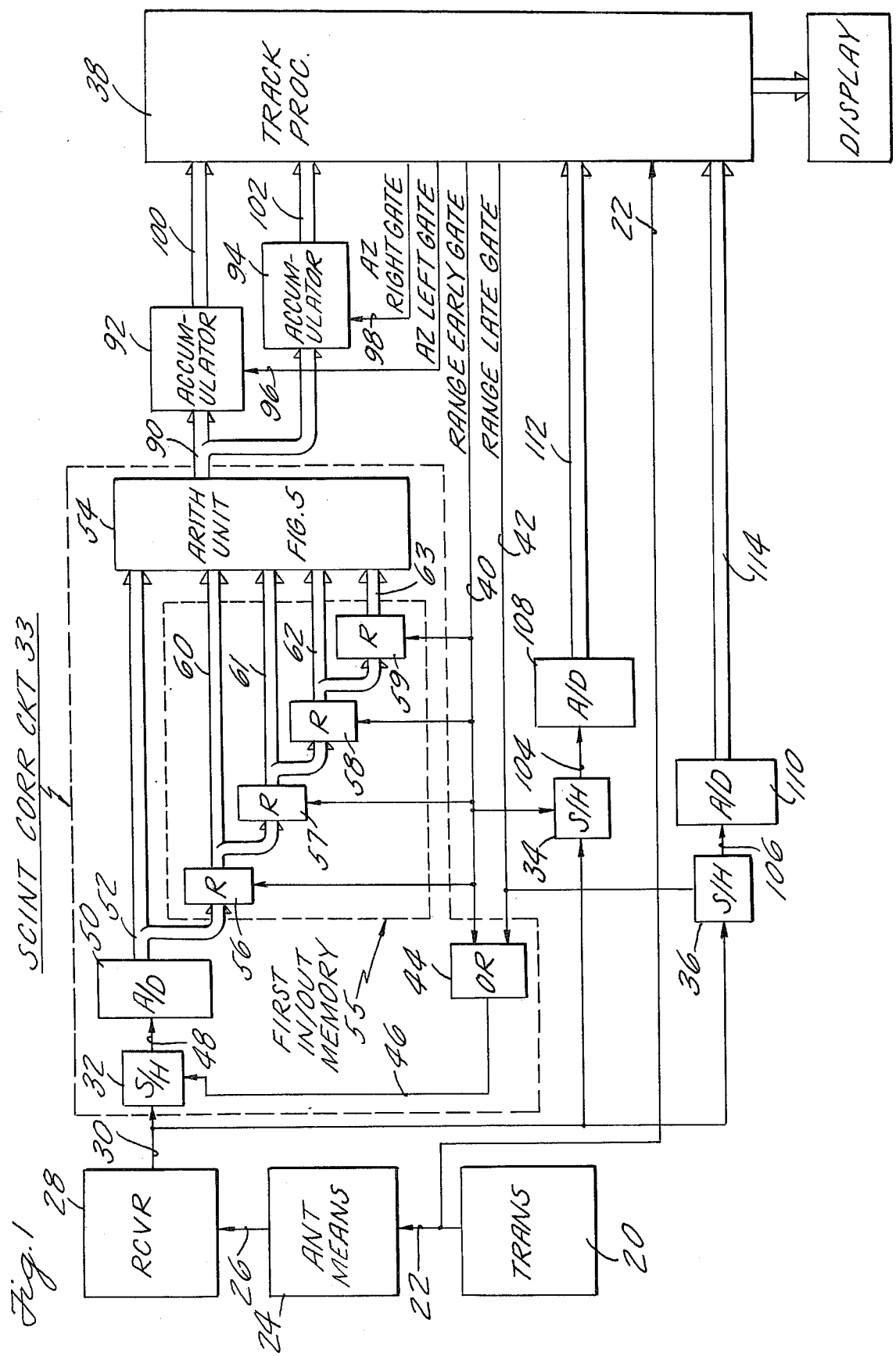
FIG. 1 is a schematic diagram of an exemplary embodiment of the invention as used in a track while scan radar system.

In a typical track while scan radar system, when a target is acquired and designated for tracking a "target window" is established in both range and azimuth by the range and azimuth gates, the only signals responded to by the tracking processor are return radar signals which appear within the target window. The tracking processor generates a pair of range gates for each target return signal from the designated target, a range early gate (REG) having a minimum on time corresponding to the time differential between the leading edge and the center of the target return signal, and a range late gate (RLG) having a minimum on time corresponding to the time differential from the center to the trailing edge of the target return signal. The tracking processor receives that portion of the total magnitude of each target return signal corresponding to the on time of each of the range gates, and compares the two portions to determine the existence of any offset of the range gates from the center of the pulse energy distribution. In all cases in which the return energies in each gate are not equal, the processor provides an update of the range cursor coordinates (the point corresponding to the end of the REG and the beginning of the RLG).

For a typical target providing a multiplicity of target return signals for each antenna scan through the target, the locus of the magnitudes of the multiple return signals forming a target envelope which is ideally representative of the target silhouette, the relative azimuth position of the target is determined by comparing the sum of the magnitudes of the return signals within the target envelope received on either side of an assumed envelope midpoint. The tracking processor performs this function by providing a pair of azimuth timing gates for each target envelope, an azimuth left gate (ALG) having a minimum on time corresponding to the time differential between the beginning and the midpoint of the target envelope, and an azimuth right gate (ARG) having a minimum on time corresponding to the time differential between the midpoint and the end of the envelope. The tracking processor compares the sum of the magnitudes of the return target signals received within each of the two azimuth gates and provides an update of the azimuth cursor coordinates (the azimuthal point corresponding to the end of the ALG and the beginning of the ARG) in all cases for which the energy contained within the two azimuth gates are not equal.

The description given hereinbefore describes the operation of a track while scan radar system in determining the range and azimuth cursor coordinates of a designated target, all of which is well known in the prior art. However, the accuracy of the energy comparisons made in the respective range and azimuth gates are dependent upon the overall shape of the received target return signals and the target envelope. The effects of scintillation, as described hereinbefore, cause the return signal amplitudes to vary discontinuously. Since a typical target provides a plurality of return signals within the target envelope of each scan a good average value for the signal width of the individual return signals is established, such that the range determination is not substantially effected by scintillation, however, the discontinuity in magnitude of individual return signals causes errors in the determination of the relative azimuth position due to the difficulty in determining the relative energy distribution within the target return envelope on either side of the azimuth cursor.

Figure 2:
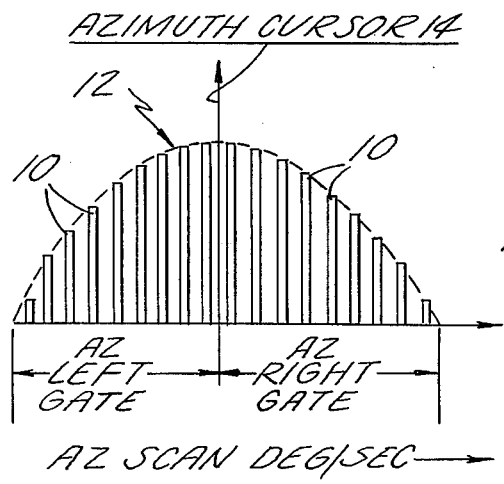
FIG. 2 is an illustration of an ideal target return envelope containing a plurality of target return signals.
Figure 3:
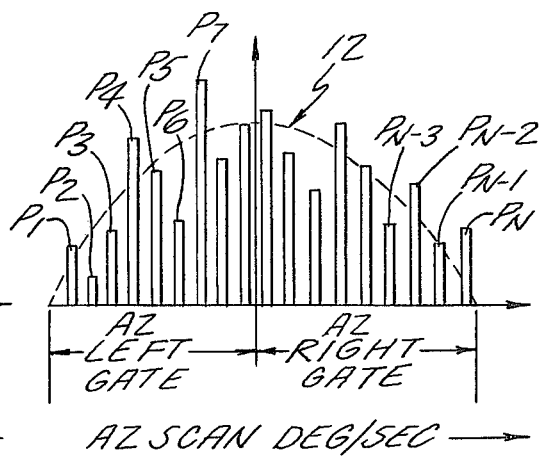
FIG. 3 is an illustration of a typical scintillating target return envelope containing a plurality of target return signals.

The effect of scintillation upon a return target envelope is exemplified by reference to a point target (an ideal, fictitious target having no extent or width) which in the absence of scintillation has an envelope shape approximately equal to that of the radar main beam pattern as shown in FIG. 2, wherein a plurality of return pulses 10 are distributed within an envelope 12 whose shape approximates the radar main beam shape, and which has its mean energy content centered about an azimuth cursor 14. The cursor 14 represents the transition point between the ALG and the ARG. In the case of a scintillating target, a typical return target envelope is shown in FIG. 3, wherein successive pulses have amplitudes which are discontinuous due to random attenuation. The energy distribution approaches that of the ideal envelope 12 only on an average basis, resulting from a multiple number of scans through the target. Therefore, on any single scan, the comparison of the energies in the ALG and the ARG result in an erroneous mean energy distribution and consequently in large short term errors. The present invention provides an improved track while scan operation on scintillating point targets. As described hereinafter, the present invention uses the history of a number of preceding target return signals to provide a signal prediction of the magnitude of a succeeding return signal, while further providing for the selection of either the actual magnitude or the predicted magnitude of each succeeding signal for presentation to the tracking processor.

Referring now to FIG. 1, in a track while scan radar system having circuitry for improved operation on scintillating point targets according to the present invention, a radar transmitter 20 provides radar main bang pulses on a line 22 to an antenna means 24 which radiates these main bang signals while scanning across the area of a selected sector. The antenna means 24 receives the target return signals, and provides these signals through a line 26 to a receiver 28 which provides all of the returned radar signals received from an entire sector scan on a line 30. The line 30 is connected to a gated sample and hold circuit 32 of a scintillation correction circuit 33, and to gated sample and hold circuits 34, 36. While the line 30 provides all of the return signals received throughout the entire sector scan, only those targets within the "tracking window" are required for target tracking, therefore, the three sample and hold circuits are controlled by gate signals, described hereinbelow, which provide selective data sampling of only the return signals within the defined "target window". A tracking processor 38 provides a range early gate (REG) signal, and a range late gate (RLG) at the pulse repetition frequency of the main bang signal on a pair of lines 40, 42 to an OR circuit 44. The OR circuit 44 provides a gate signal on a line 46 in response to the presence of a REG or a RLG on the lines 40, 42, such that the on time of the gating signal on the line 46 is equal to the sum of the on times of these two range gates. The gate signal on the line 46 is presented to the sample and hold circuit 32, allowing the sample and hold circuit to receive those return radar signals on the line 30 corresponding to the on time of the gate signal.

Since both range gate signals are present for each of the return radar pulses within a target envelope and are generated sequentially for each return pulse, the sample and hold circuit 32 is gated on for the entire pulsewidth of each of the designated target return signals.

The sample and hold circuit 32 provides the sampled return signals through a line 48 to an analog to digital (A/D) converter 50, which provides a binary signal on a set of lines 52 representative of the magnitude of the target return signal on the line 48. The signal on the lines 52 is presented to one input of an arithmetic unit 54, and to the input of a first in/first out memory 55. The memory 55 is comprised of a number of registers of a type well known in the art, such as the Texas Instrument's SN74174. The number of registers may vary from a minimum of two to a maximum of five or more depending upon the system accuracy requirements of the curve fitting process of the arithmetic unit 54, described hereinafter. In the embodiment of FIG. 1, the memory 55 is comprised of four registers 56–59, each register providing a signal on a respective set of output lines 60–63 to a different input of the arithmetic unit 54. In addition, the registers 56–59 are interconnected with each other in a serial fashion, such that the register 56 provides its output signal to the input of the register 57, the register 57 presents its output signal to the input of the register 58, and the register 58 presents its output signal to the input of the register 59. The registers are enabled by the REG signal on the line 40, causing a transfer of the data at the register input lines to its output lines. In this manner successive signals on the lines 52 are "rippled" through the registers 56–59 and the lines 60–63 by successive REG signals on the line 40, and the arithmetic unit 54 receives, in addition to the present pulse on the lines 52, the four immediately preceding pulses.

Figure 4:
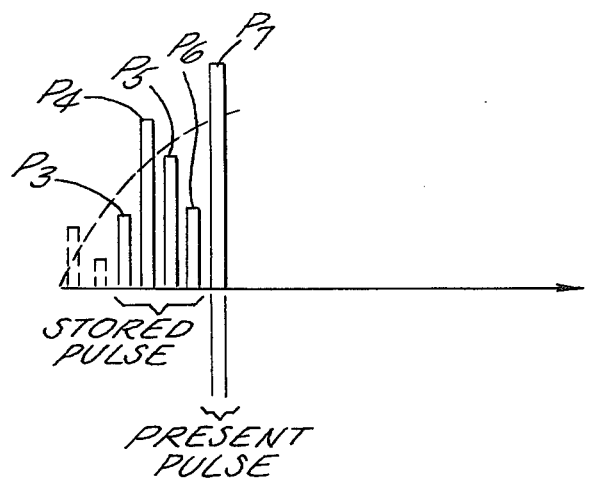
FIG. 4 is a partial illustration of the scintillating target return envelope of FIG. 3.

To illustrate the operation of the memory 55, the first target return signal $P_1$ (of FIG. 3) is sampled by the sample and hold circuit 32, and is presented through the line 48 to the A/D converter 50. The binary signal equivalent of the $P_1$ magnitude is presented simultaneously through the lines 52 to the arithmetic unit 54 and to the register 57. The second target return signal ($P_2$) appears on the line 30 and is processed in an identical manner, providing the binary signal equivalent of the $P_2$ magnitude on the lines 52, while the REG signal corresponding to the pulse $P_2$ enables the register 56 and transfers the prior $P_1$ signal to the lines 60. At the completion of the $P_2$ pulse the arithmetic unit 54 is provided with two signals on the lines 60, 52 corresponding to the magnitudes of the pulses $P_1$ and $P_2$ respectively. Subsequent return signals are processed in an identical manner, such that at the completion of the $P_5$ signal the arithmetic unit 54 is provided with the presently received signal ($P_5$) on the lines 52 and the immediately preceding four signals ($P_1 - P_4$) on the lines 63, 62, 61, and 60. For subsequent return signals the process is repeated with the arithmetic unit 54 receiving the signal equivalents of the actual magnitudes of the presently received signal and that of the four immediately preceding signals, as shown in FIG. 4, wherein a present signal pulse ($P_7$) appears on the lines 52 while the immediately preceding four pulses ($P_3 - P_6$) appear on the lines 63, 62, 61 and 60 respectively.

As described hereinafter with respect to FIG. 5, the arithmetic unit processes the stored preceding signal information on the lines 60–63 to provide a predicted signal magnitude for the succeeding return signal. The unit then compares the actual magnitude of the succeeding signal to that of the predicted signal and performs a logical decision as to whether the predicted value or the actual value will be used.

Figure 5:
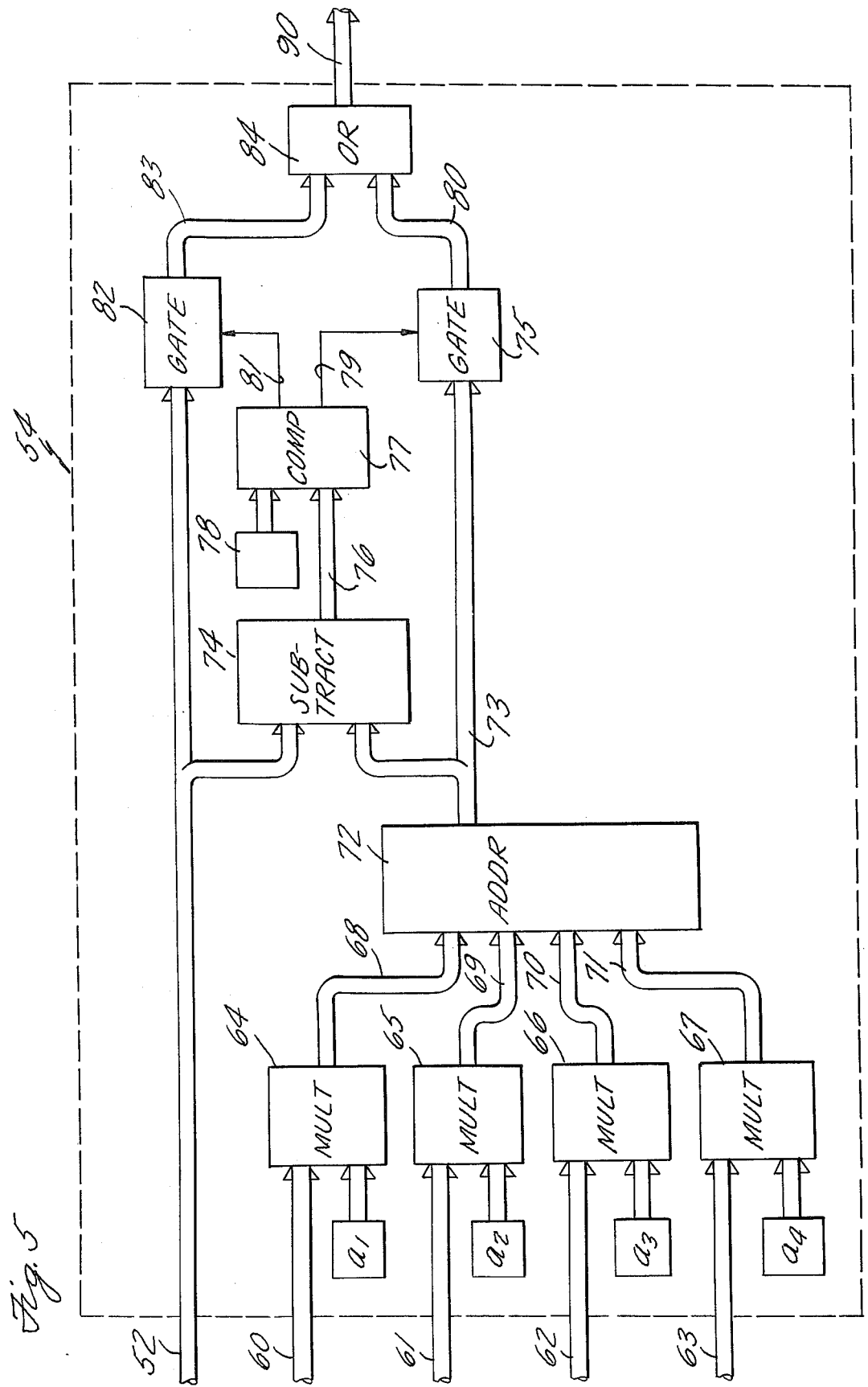
FIG. 5 is a schematic diagram of a portion of the invention as used in the embodiment of FIG. 1.

Referring now to FIG. 5, in the arithmetic unit 54, the sets of lines 60–63 from the memory 55 are presented to digital multipliers 64–67. Each of the multipliers 64–67 is also provided with a fixed signal quantity at a second input to the multiplier represented by the constants $a_1 - a_4$. The constants $a_1 - a_4$ represent the solutions of the first four terms of a standard curve fitting equation describing a reference target envelope (envelope 12 of FIGS. 3, 4, which represents the locus of the peak amplitudes of all of the ideal target return signals received in one scan of the antenna 24 through the target), which for a point target (having no extent or width) is equal to a curve describing the radar main beam pattern. In the embodiment of FIGS. 1, 5 the reference target envelope is assumed to be sinusoidal as shown by the envelope 12 of FIGS. 3, 4. The constant values $a_1 - a_4$ have magnitudes which may be either of a positive or negative value as determined by the solutions of the curve fitting equation. Such curve fitting procedures, and the solution of the equation terms are well known in the art, and a discussion of one such procedure may be found in a book entitled, *The Mathematics of Physics and Chemistry* by Margenau and Murphy; 2nd Edition 1956, pages 516–519.

The accuracy of the curve fitting equation is dependent on the number of equation terms used, and the embodiment of FIGS. 1, 5 uses only the first four terms. Additional terms may be used with a resultant addition of registers within the memory 55, and the addition of an equal number of multipliers and constant values in the arithmetic unit 54.

The multipliers 64–67 provide signals on output lines 68–71, which are representative of the products of the four most recent signal magnitudes and their respective constant values. The signals on the lines 68–71 are presented to an adding means 72, comprised of some number of full adders of a type well known in the art, which provides a signal on its output lines 73 representative of the predicted magnitude of the succeeding target return signal as defined by the expression:

$$P_N = a_1 P_{N-1} + a_2 P_{N-2} + a_3 P_{N-3} + a_4 P_{N-4} \qquad (1)$$

where $P_N$ is the predicted magnitude of the succeeding target return signal, and $P_{N-1} - p_{N-4}$ are the actual magnitudes of the four preceding target return signals.

The signal on the lines 73 is presented to a subtractor circuit 74 and to a gate circuit 75. The subtractor 74 also receives the signal on the lines 52 (the actual magnitude of the presently received pulse) and provides a signal on lines 76 which is representative of the difference in magnitude between the two signals. The difference signal on the lines 76 is presented to a comparing means 77, which compares the signal to a predetermined tolerance whose value is derived from the values of the constants ($a_1 - a_4$) used for the reference curve, and which is provided by a signal source 78. The comparing means 77 provides a discrete signal on a line 78 to the gate circuit 75 when the difference signal on the line 76 is greater than the tolerance value, enabling the gate circuit which transfers the predicted magnitude signal value on the lines 73 to a set of lines 80. For the condition wherein the difference signal on the lines 76 is less than the tolerance value, the comparing means 77 provides a discrete signal on a line 81 to a second gate circuit 82 having its input connected to the lines 52, enabling this gate which transfers the actual target return signal on the lines 52 to a set of lines 83. The lines 80, 83 are presented to an OR circuit 84, which provides on output lines 90 the signal from either of the lines.

Referring again to FIG. 1, the output of the arithmetic unit 54 is provided through lines 90 to digital accumulators 92, 94. The accumulators are of a type well known in the art, and are comprised of full adders for performing addition of the signals on the lines 90, and shift registers for storing the sum of the signals. The accumulator 92 is controlled by an azimuth left gate signal (ALG) on a line 96 from the processor 38, which has a minimum on time equal to that half of the target envelope lying substantially to the left of the azimuth cursor (14 in FIG. 2). Similarly, the accumulator 94 is controlled by an azimuth right gate (ARG) on a line 98 from the processor, having a minimum on time equal to that half of the target envelope lying substantially to the right of the azimuth cursor. The accumulators 92, 94 provide the sum of the target return signal magnitudes lying to the left of and to the right of the azimuth cursor respectively, through lines 100, 102 to the tracking processor 38. The processor 38 provides an error signal proportional to the difference of these two signals divided by the sum of the two (in a manner well known in the art), which is used to provide new azimuth cursor coordinates for the azimuth timing gates (ARG, ALG) for all cases in which the error signal is some value other than zero.

The sample and hold circuits 34, 36 are gated on by the REG and RLG signals on the lines 40, 42, and similarly sample the early and late gate portion of each of the return radar pulses as described hereinbefore. The output signals from the circuits 34, 36 are presented through lines 104, 106 to A/D converters 108, 110. The A/D converters 108, 110 provide binary signal equivalents of the early and late return pulse portions on the lines 112, 114 to the tracking processor 38, which processes the signal in the manner identical to that described hereinbefore to provide any necessary change in the range cursor coordinates, and range timing gates (REG, RLG).

Figure 6:
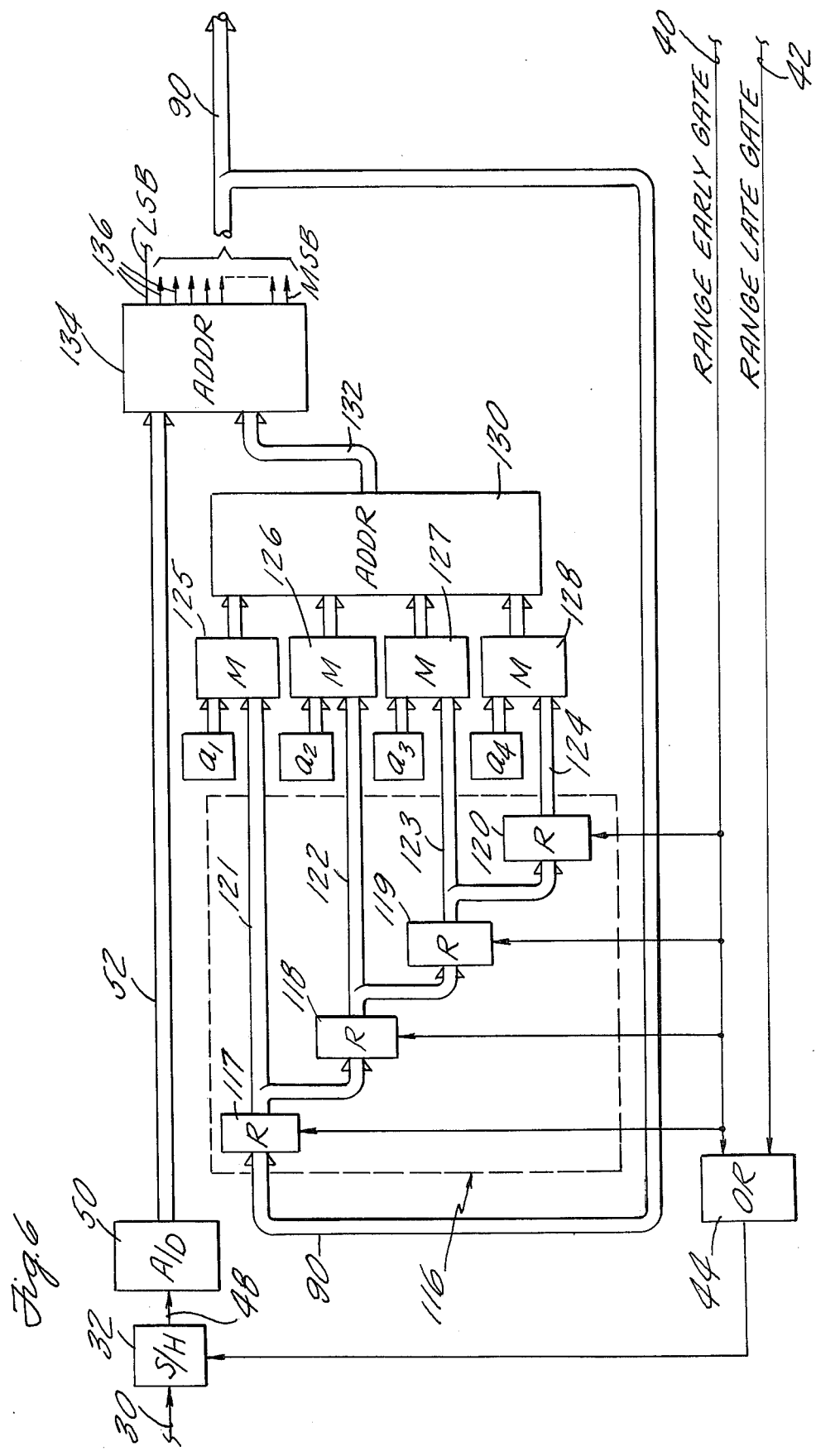
FIG. 6 is a schematic diagram of an alternative embodiment of the invention.

In an alternative embodiment of the scintillation correction circuitry shown in FIG. 6, a first in/first out memory 116, identical to the memory 55 of FIG. 1 is comprised of registers 117–120 having respective sets of output lines 121–124. The lines 121–124 are presented to multipliers 125–128 which are identical to the multipliers 64–67 of FIG. 5 and each of which receives the signal constants $a_1 - a_4$ which are identical to those constants described hereinbefore with respect to FIG. 5. Similarly, the product signals from the multipliers 125–128 are presented to an adding means 130, identical to the adding means 72 of FIG. 5, which provides a signal on a set of lines 132 representative of the sum of the products as defined by equation (1), described hereinbefore. The signal on the lines 132 is presented to a full adder 134 of a type well known in the art which receives at a second input the binary signal equivalent of the target return signals on the lines 52. The full adder 134 provides the sum quantity of the actual target return magnitude on the line 52 and the predicted target signal magnitude on the lines 132, on its output lines 136. For an adder having M bit output lines, the set of lines 90 (FIGS. 1, 5) are connected to the more significant M-1 bit lines by excluding any connection to the least significant bit (LSB) line. As a result, the LSB of the set of lines 90 corresponds to the second LSB of the adder output lines 136, providing a signal on the lines 90 equal to one half of the magnitude of the signal on the lines 136. The signal on the lines 90 is presented to the accumulators 92, 94 of FIG. 1, and is also presented to the input of the register 117 of the memory 116.

In operation, the binary signal on the set of lines 52 is presented to the adder 134. The adder receives in addition the predicted signal magnitude of the target return signal on the lines 132, and provides the sum of the two signals on its output lines 136. The set of lines 90 receives all of the bit lines comprising the output lines 136 which are greater than the LSB, causing the signal on the lines 90 to be representative of the mean value of the actual and predicted magnitudes. The signal on the lines 90 is presented to the accumulators 92, 94 (FIG. 1) which provides the sum of the magnitudes of the signals appearing in each of the two azimuth gates as described hereinbefore. The signal on the lines 90 is also presented to the first register 117 of the memory 116, which is identical to the memory 55 of FIG. 1, causing the signals on the lines 90 to be "rippled through" the registers 117–120 and the corresponding lines 121–124 in a manner identical to that described hereinbefore with respect to the memory 55, with the exception being that the signals stored and rippled through the memory 116 represent the mean value of the actual and predicted magnitudes as opposed to the actual magnitudes as in the memory 55 of FIG. 1. The registers 117–120 are enabled in the same manner as the registers 56–59 (FIG. 1) by the REG signal on the line 40.

The embodiment of the present invention of FIG. 6 represents one alternative embodiment of the present invention. In addition, other embodiments may comprise the selection of the greater magnitude signal from among the actual magnitude on the lines 52, and the predicted magnitude on the lines 132.

Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described typical embodiments of my invention, that which I claim as new and desire to secure by Letters Patent is:

1. In a track while scan radar system having a tracking processor for providing range and azimuth tracking gates for automatic range and azimuth cursor tracking of a designated target in response to the magnitudes of the designated target return signals received within said tracking gates, a circuit for providing improved azimuth tracking of the designated target, comprising:

means for providing the actual magnitudes of said target return signals corresponding to each of the range tracking gates, and for providing in response thereto a signal prediction of the magnitude of each succeeding target return signal as a function of preceding target return signals;

means responsive to said last named means for providing a signal manifestation of each succeeding target return signal, the signal manifestation magnitude being a function of the comparative magnitudes of the predicted and actual target return signals; and means responsive to said signal manifestation means for providing a signal to the tracking processor representative of the sum of the magnitudes of all of said signal manifestations corresponding to each of the azimuth tracking gates.

2. A circuit according to claim 1 wherein the signal manifestation of each succeeding target return signal has a magnitude equal to the predicted magnitude whenever the magnitude of the actual target return signal is less than the magnitude of the predicted signal by a predetermined tolerance, the signal manifestation magnitude being equal to the magnitude of the actual target return signal in all other instances.

3. A track while scan radar system comprising:

means including a scanning antenna, a pulse transmitter, and a receiver for illuminating successive portions of a scanned area with a pulsed radar energy and receiving return signals reflected from targets located in said area and providing at the output of the receiver video signals representative of the target returned signals, each of said targets providing a plurality of target return signals for each scan through the target, the locus of which form a target envelope;

processing means including cursor means identifying a point within said area for providing range tracking gates corresponding to each of said target return signals and for providing azimuth tracking gates corresponding to each half of the target envelope, said processing means adjusting the position of the point defined by said cursor means in response to the magnitudes of the signals falling within said tracking gates;

means for providing the actual magnitudes of target return signals received within each of said range tracking gates and for providing in response thereto a signal prediction of the magnitude of each succeeding target return signal as a function of the preceding target return signals;

means responsive to said last named means for providing a signal manifestation of each succeeding target return signal, said signal manifestation magnitude being equal to said predicted magnitude whenever the magnitude of the actual target return signal is less than said predicted magnitude by a predetermined tolerance, said signal manifestation magnitude being equal to the magnitude of the actual target return signal in all other instances; and means responsive to said signal manifestation means for providing a signal to the tracking processor representative of the sum of the magnitudes of all of said signal manifestations occurring within each of the target envelopes and corresponding to each of said azimuth tracking gates.

* * * * *